United States Patent
Williamson, III

(10) Patent No.: US 7,280,568 B2
(45) Date of Patent: Oct. 9, 2007

(54) LASER COHERENCE CONTROL USING HOMOGENEOUS LINEWIDTH BROADENING

(75) Inventor: Robert S. Williamson, III, Madison, WI (US)

(73) Assignee: New Focus, Inc., San Jose, CA (US)

( * ) Notice: Subject to any disclaimer, the term of this patent is extended or adjusted under 35 U.S.C. 154(b) by 363 days.

(21) Appl. No.: 10/652,429

(22) Filed: Aug. 29, 2003

(65) Prior Publication Data

US 2005/0047454 A1   Mar. 3, 2005

(51) Int. Cl.
*H01S 3/115* (2006.01)
*H01S 3/10* (2006.01)

(52) U.S. Cl. .......................................... 372/12; 372/26
(58) Field of Classification Search ................... 372/9, 372/12, 26
See application file for complete search history.

(56) References Cited

U.S. PATENT DOCUMENTS

| | | | | |
|---|---|---|---|---|
| 3,432,770 A | * | 3/1969 | Massey | 372/28 |
| 4,299,484 A | * | 11/1981 | Holzapfel | 356/5.1 |
| 4,841,528 A | * | 6/1989 | Sipes et al. | 372/22 |
| 5,189,547 A | | 2/1993 | Dat et al. | 359/245 |
| 5,295,209 A | * | 3/1994 | Huber | 385/37 |
| 5,400,417 A | * | 3/1995 | Allie et al. | 385/2 |
| 5,434,693 A | | 7/1995 | Tanaka et al. | 395/180 |
| 5,621,744 A | | 4/1997 | Kikuchi et al. | 372/12 |
| 5,663,822 A | * | 9/1997 | Fee | 398/95 |
| 5,892,607 A | | 4/1999 | Atlas | 359/183 |
| 5,917,636 A | | 6/1999 | Wake et al. | 359/180 |
| 6,128,030 A | | 10/2000 | Kikuchi et al. | 347/255 |

(Continued)

FOREIGN PATENT DOCUMENTS

EP    0765046    11/1992

(Continued)

OTHER PUBLICATIONS

R. Kowalski et al., "A frequency-modulated injection-locked diode laser for two-frequency generation," Review of Scientific Instruments, vol. 72, No. 6, Jun. 2001.

(Continued)

*Primary Examiner*—Armando Rodriguez
(74) *Attorney, Agent, or Firm*—Morrison & Foerster LLP

(57) ABSTRACT

An apparatus and method for linewidth broadening applied to a laser that emits a light having an output frequency $\nu$ and an emission linewidth $\delta_E$. The apparatus is equipped with an electro-optic modulator for intercepting the light and a noise generator for driving the electro-optic modulator with a radio-frequency (RF) noise signal spanning a frequency range selected to broaden the emission linewidth $\delta_E$ of the light passing through the electro-optic modulator to a broadened linewidth $\delta_B$. The noise spectrum of the noise signal exhibits a continuous frequency range and can be flat or sloping. The range extends from low frequency $\omega_L$ set below the emission linewidth $\delta_E$ of the light to a high frequency $\omega_H$ set above the emission linewidth $\delta_E$ of the light. The electro-optic modulator can be selected from among many suitable devices including optical crystals. Further broadening can be achieved by employing one or more secondary EOMs operating in resonant or non-resonant modes. The lasers that benefit from the invention involve any type of inherently narrow bandwidth lasers operating in CW or pulsed modes.

21 Claims, 5 Drawing Sheets

U.S. PATENT DOCUMENTS

| | | | |
|---|---|---|---|
| 6,906,309 B2* | 6/2005 | Sayyah et al. | 250/227.11 |
| 2002/0043618 A1 | 4/2002 | Storz et al. | 250/234 |
| 2002/0196509 A1 | 12/2002 | Smilanski et al. | 359/188 |
| 2004/0028414 A1* | 2/2004 | Quesenberry et al. | 398/141 |

FOREIGN PATENT DOCUMENTS

| | | |
|---|---|---|
| GB | 2313674 | 9/1996 |
| JP | 04302011 | 12/1992 |

OTHER PUBLICATIONS

Paul Feng et al., "Inexpensive diode laser microwave modulation for atom trapping," Am. J. Phys. 63 (10), Oct. 1995.

M. J. Lim et al., "Improved design of a frequency-shifted feedback diode laser for optical pumping at high magnetic field," Optics Communications 147 (1998) 99-102, Feb. 1, 1998.

A. P. Willis et al., "External cavity laser diodes with frequency-shifted feedback," Optics Communciations 116 (1995) 87-93, Apr. 15, 1995.

P. I. Richter et al., "Diode lasers in external cavities with frequency-shifted feedback," Optics Communications 85 (1991) 414-418.

F. V. Kowalski et al., "Broadband continuous-wave laser," Optics Letters/vol. 13, No. 8/ Aug. 1988.

A. Dunbar et al., "Extended Athena alignment performance and application for the 100 NM technology node," ASML (Netherlands), Proceedings of SPIE, vol. 4344, Metrology, Inspection, and Process Control for Microlithography XV, paper #4344-85 (2001).

* cited by examiner

LASER COHERENCE CONTROL USING HOMOGENEOUS LINEWIDTH BROADENING

FIELD OF THE INVENTION

The present invention relates to a method and apparatus for broadening the linewidth of light emitted from a laser, and more particularly to broadening the linewidth homogeneously to shorten the coherence length of the emitted light.

BACKGROUND OF THE INVENTION

A variety of optical systems and devices use laser light. Many types of lasers are well-known for emitting light with a stable output frequency $v$ while exhibiting a narrow linewidth $\Delta v$ and a long coherence length $L_c$. In fact, narrow linewidth implies large coherence length $L_c$ since the relationship between coherence length $L_c$ and linewidth $\Delta v$ is:

$$L_c = \frac{c}{\Delta v},$$

where c is the speed of light.

A number of applications require light that has a stable output frequency $v$ but a broad linewidth $\Delta v$. More specifically, they require light whose optical output frequency is constant or has a known stochastic property over time yet simultaneously spans a broad frequency range (i.e., has a large bandwidth).

To comply with the first requirement of stable emission frequency $v$ the art teaches laser cavities that have a high finesse and carefully controlled geometry. Unfortunately, the byproduct of cavities with high finesse is a narrow emission linewidth. Of course, the linewidth depends also on the laser type and cavity configuration, but it is still often less than 1-10 MHz and thus too narrow for many applications.

Numerous optical systems using light with a large coherence length $L_c$ can suffer from unwanted interference fringes. That is because such systems have a number of optical surfaces that support reflection and can thus produce undesired interference patterns. This undesired interference, also referred to as "ghost fringes", creates spurious signals that can wash out the desired fringes or degrade the accuracy of measurement.

Interferometry is among the many applications in which a controlled coherence length $L_c$ is desirable. An interferometer requires coherence only over a limited distance such that interference fringes are created just between the optical surfaces of interest. These surfaces are often close to one another. Thus, it is desirable for the optical path difference (OPD) between the surfaces of interest to be roughly the same as the coherence length $L_c$.

To produce light exhibiting stable frequency and broad linewidth the prior art teaches the use of inherently broad sources, such as superluminescent diodes (SLDs), light emitting diodes (LEDs), Fabry-Perot diodes (FPDs) or emission sources such as mercury lamps. These sources can have very short coherence lengths, e.g., on the order of microns, but suffer from one or more of the following disadvantages: Their coherence length $L_c$ is not readily adjustable, since it is an inherent characteristic of the light source; their output power is low (such as the SLD); or they exhibit low spatial coherence (in particular, LEDs). Finally, they can exhibit a high sideband content (e.g., FPDs), which is inhomogeneous and can result in ghost fringes or washed-out fringes.

The prior art also teaches frequency shifting with the aid of devices such as discrete electro-optical modulators (EOMs) driven at a particular frequency to add sidebands beyond the linewidth. There are numerous teachings on appropriate resonant electronic circuitry to drive EOMs to create sidebands such as U.S. Pat. No. 5,189,547 to Day et al. Sidebands effectively shorten the average coherence length $L_c$ and can thus be used to broaden the linewidth as taught, e.g., by A. Dunbar et al., "Extended ATHENA Alignment Performance and Application for the 100 nm Technology Node", ASML (Netherlands), Proceedings of SPIE, Vol. 4344,Metrology, Inspection, and Process Control for Microlithography XV, paper #4344-85 (2001). For related teachings on the use of EOMs or electroabsorption modulators for creating sidebands, harmonics and combs of spaced frequencies as well as frequency shifting the reader is referred to U.S. Pat. Nos. 5,917,636; 5,621,744; 5,434,693 and U.S. Application No. 2002/0196509.

Unfortunately, the presence of discrete sidebands will cause strong interference at optical path differences (OPDs) described by:

$$OPD = \frac{c}{v_m}$$

where $v_m$ is the modulation frequency. Thus, if any optical surfaces of the optical system capable of producing interference happen to have this spacing, then corresponding strong interference fringes will appear. This problem can be solved, albeit in a cumbersome manner, by carefully designing the spacings of elements in the optical system and/or adjusting the modulation frequency.

Yet another approach taught in the art is the use of in-cavity linewidth-broadening elements such as acousto-optic modulators (AOMs). In this approach the linewidth is varied continuously by adjusting the RF power delivered to the AOM. For teachings on how AOMs and/or acousto-optic tunable filters (AOTFs) can be used in various in-cavity configurations including external cavity diode lasers (ECDLs) the reader is referred to F. V. Kowalski et al., "Broadband Continuous-Wave Laser", Optics Letters, Vol. 13,pp. 622-4 (1988); P. I. Richter and T. W. Hansch, "Diode Lasers in External Cavities with Frequency-Shifted Feedback", Optics Communications, Vol. 85,pp. 414-418 (1991); A. P. Willis et al., "External Cavity Laser Diodes with Frequency-Shifted Feedback", Optics Communications, Vol. 116, pp. 87-93 (1995); and M. J. Lim et al., "Improved Design of a Frequency-Shifted Feedback Diode Laser for Optical Pumping at High Magnetic Field", Optical Communications, Vol. 147,pp. 99-102 (1998).

The primary disadvantages of this technique are that it requires a custom-designed ECDL and that the broadening is limited by the available frequencies of AOMs and their power-handling capability. Furthermore, the introduction of the AOM into the cavity reduces the power output of the laser.

Still another prior art approach to broaden the linewidth teaches radio-frequency (RF) modulation of a laser diode current to introduce sidebands. For more specific information on this approach the reader is referred to Paul Feng and Thad Walker, "Inexpensive Diode Laser Microwave Modulation for Atom Trapping", American Journal of Physics, Vol. 63 (No. 10), pp. 905-8 (1995) and R. Kowalski et al., "A Frequency-Modulated Injection-Locked Diode Laser for Two-Frequency Generation", Review of Scientific Instruments, Vol. 72, No. 6, pp. 2532-4 (2001).

Besides the above-discussed disadvantages caused by discrete sidebands, this approach is limited in that it only works with laser diodes and furthermore the modulation frequency is limited by the bandwidth of the laser diode itself and by the diode packaging. Furthermore, modulation of the laser diode current often introduces undesirable residual amplitude modulation (RAM) of the laser output power.

Still another approach to broadening a beam of laser light is addressed by Storz in U.S. Application 2002/0043618. Storz teaches to use an electro-optic modulator as a phase modulation means for varying the phase angle of light in a confocal microscope. Storz indicates that the noise signal can be periodic or stochastic. Unfortunately, this manner of applying noise to an electro-optic modulator, although capable of broadening the emission linewidth of a laser, is not capable of homogeneously broadening it in a controlled manner, which is what the art requires.

Therefore, there still exists an unsolved problem of broadening the emission linewidth of lasers in a homogeneous and simple manner.

OBJECTS AND ADVANTAGES

In view of the shortcomings of the prior art, it is a primary object of the present invention to provide a laser coherence control and method to enable broadening of an emission linewidth of any laser. More specifically, the desired control and method should allow for essentially homogeneous broadening of the linewidth without significantly decreasing the optical power.

These and numerous other objects and advantages of the present invention will become apparent upon reading the following description.

SUMMARY

In one embodiment the invention comprises an apparatus for linewidth broadening applied to a laser that emits a light having an output frequency v and an emission linewidth $\delta_E$. The apparatus is equipped with an electro-optic modulator for intercepting the light. A noise generator is provided for driving the electro-optic modulator with a radio-frequency (RF) noise signal spanning a certain frequency range such that the emission linewidth $\delta_E$ of the light passing through the electro-optic modulator is broadened to a broadened linewidth $\delta_B$.

In one embodiment of the invention the noise generator is made up of a noise source and a filtering element. For example, the filtering element is a low-pass filter with a passband set within the frequency range of the noise signal. The filtering element can also have a passband control for varying the passband of the filtering element. In one embodiment the noise generator has an essentially flat noise spectrum within the frequency range of the noise signal. Alternatively, the noise generator has a sloping noise spectrum within the frequency range of the noise signal. Furthermore, in some embodiments the noise generator is further equipped with an amplification stage for amplifying the noise signal.

The frequency range of the noise signal is preferably a continuous frequency range commencing at a low frequency $\omega_L$ and terminating at a high frequency $\omega_H$. In the preferred embodiment the low frequency $\omega_L$ is set below the emission linewidth $\delta_E$ of the light while the high frequency $\omega_H$ is set above the emission linewidth $\delta_E$ of the light.

The electro-optic modulator can be selected from among many suitable devices. For example, the electro-optic modulator is an optical crystal of lithium niobate, MgO-doped lithium niobate, potassium dihydrogen phosphate (KDP), potassium dideuterium phosphate (KD*P), and potassium titanyl phosphate (KTP). In some embodiments the apparatus is equipped with further electro-optic modulators referred to as secondary electro-optic modulators. Any secondary electro-optic modulator is also set up to intercept the light and is connected to a signal generator for applying a secondary signal to the electro-optic modulator. Thus, the light is modulated by the secondary signal thereby achieving a further broadening of the broadened linewidth $\delta_B$.

In one embodiment the signal generator is a single frequency generator such that the secondary signal contains only one frequency. Any one of the secondary electro-optic modulators driven by a single frequency generator can be configured as a resonant modulator. Alternatively, the secondary signal generator is a noise generator and the signal (secondary signal) it generates spans a frequency range (secondary frequency range).

In some embodiments an impedance matching circuit is provided for impedance matching the EOM and the noise generator. More specifically, the EOM is impedance matched to all parts of the noise generator that have electrical impedance. Thus, in embodiments where the EOM is followed by a filter and amplifier, the impedance matching circuit impedance matches those elements with the EOM. In most applications the electrical impedance of the impedance matching circuit is about 50 ohms.

The lasers that can be used in the apparatus of invention and that can benefit from the method of invention involve any type of inherently narrow bandwidth lasers. These include, without limitation, edge-emitting lasers, surface-emitting lasers, gas lasers, solid-state lasers, external-cavity diode lasers, titanium-sapphire lasers, diode-pumped solid-state lasers, fiber lasers, and Neodymium-YAG lasers. Both pulsed and continuous-wave (CW) lasers can benefit from this technique.

The method of invention is applied to broadening the emission linewidth $\delta_E$ of lasers by intercepting the light they output with the aid of at least one electro-optic modulator. If only one electro-optic modulator is used, then this one is driven with a noise signal spanning a certain frequency range selected such that the light is modulated to broaden the emission linewidth $\delta_E$ to a broadened linewidth $\delta_B$. In embodiments where the light is also modulated with secondary signals to further broaden the broadened linewidth $\delta_B$, the secondary signals can be single frequency or they can be noise signals covering a secondary frequency range.

A detailed description of the invention and the preferred and alternative embodiments is presented below in reference to the attached drawing figures.

DETAILED DESCRIPTION

Figure 1A:
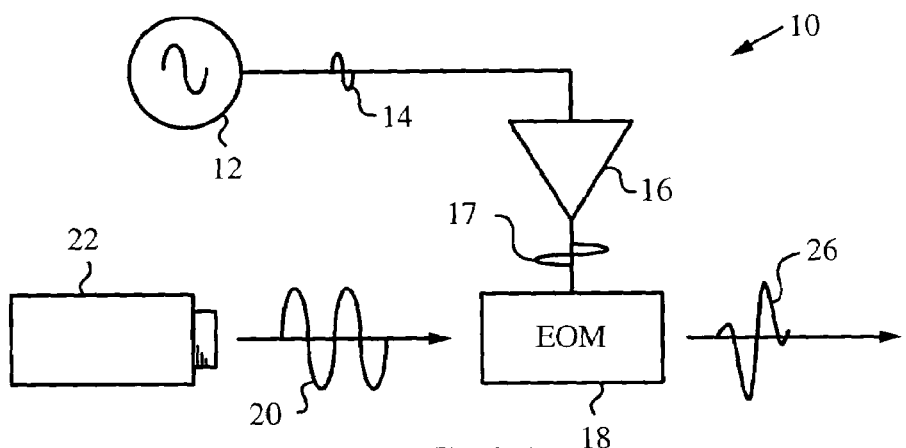
FIGS. 1A-D (Prior Art) are diagrams illustrating a common prior art method of coupling an electrical signal to a laser via an EOM to broaden the emission bandwidth by adding sidebands.
Figure 1B:
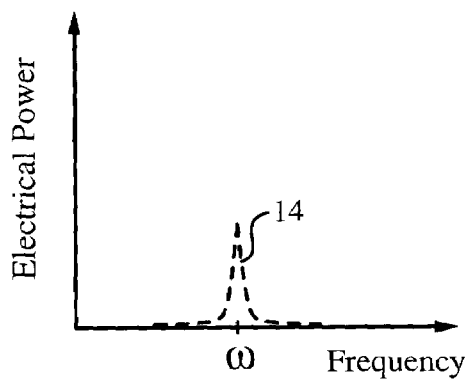

The invention at hand will be best understood by first considering a prior art apparatus 10 illustrated in the diagram of FIG. 1A. Apparatus 10 has a signal source 12 for producing an electrical signal 14 at a single frequency $\omega$. The electrical power of signal 14 is graphed as a function of frequency in FIG. 1B. An amplifier 16 is provided for amplifying signal 14.

Figure 1C:
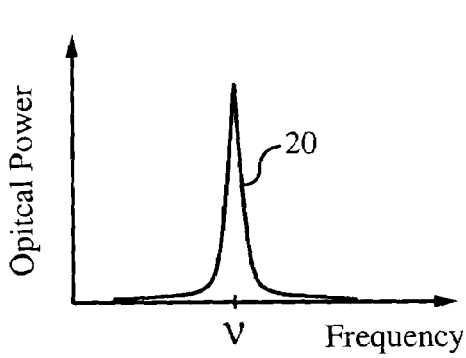

Apparatus 10 is equipped with an electro-optic modulator (EOM) 18 driven by amplified signal 17. EOM 18 is positioned to intercept a light 20 emitted in the form of a beam from a laser 22 at a frequency $\nu$. The optical power of light 20 is graphed as a function of frequency in FIG. 1C.

Figure 1D:
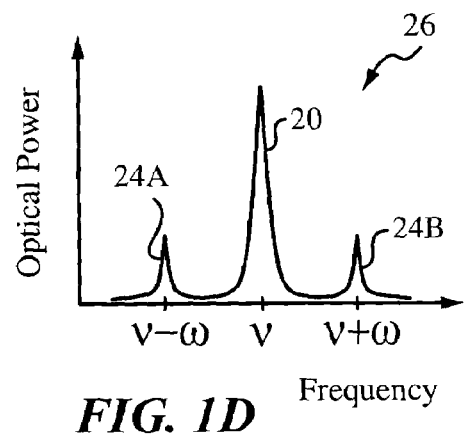

The application of amplified signal 14 to EOM 18 modulates light 20 as shown in FIG. 1D. Specifically, amplified signal 14 passing through EOM 18 mixes with light 20 to generate an optical output 26 that has two side lobes 24A, 24B in its optical frequency spectrum. While apparatus 10 effectively shortens the coherence length of laser 22, discrete sidebands 24A, 24B can cause strong interference at other optical path differences, as previously described, and are undesirable.

Figure 2A:
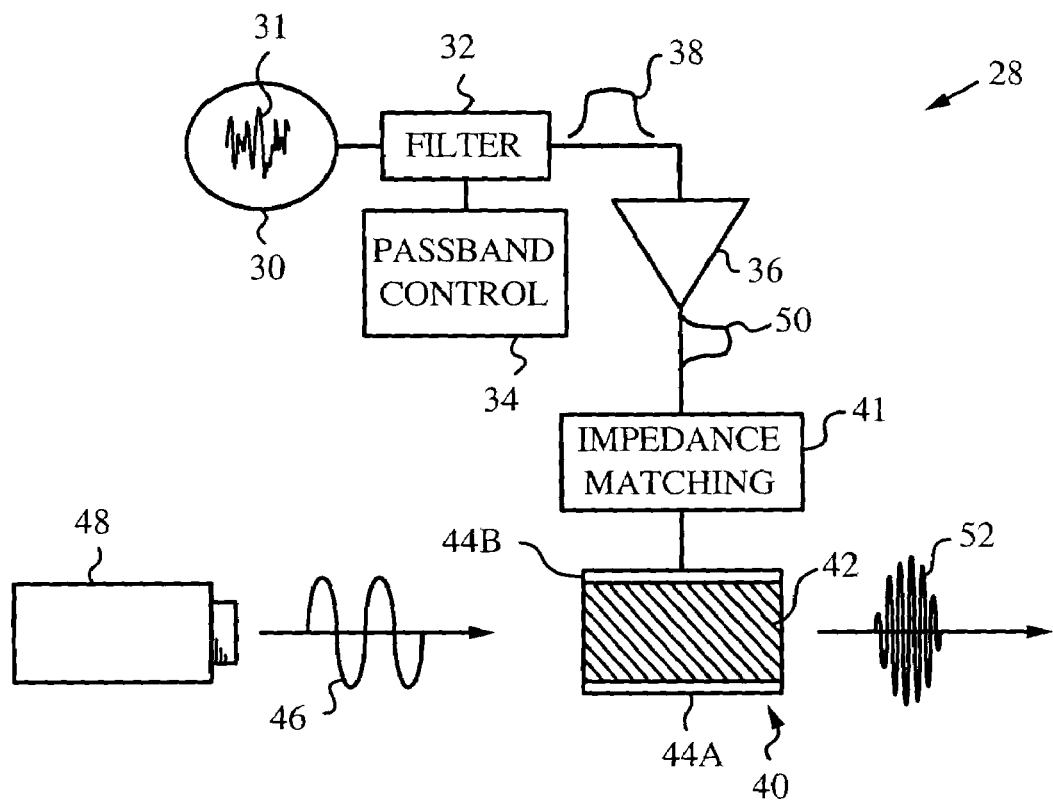
FIGS. 2A-C are diagram illustrating an embodiment of the invention in which a single broadband EOM is incorporated to spectrally broaden the laser light.

Apparatus 28, schematically illustrated in FIG. 2A, allows the user to adjust the linewidth of a laser 48; broaden an emission linewidth $\delta_E$ of laser 48 homogeneously, thus eliminating or reducing "ghost fringes"; and dynamically control changes in the coherence length $L_c$ of laser 48. Laser 48 can be any type of laser whose linewidth is to be broadened, including but not limited to edge-emitting lasers, surface-emitting lasers, gas lasers, solid-state lasers, external-cavity diode lasers, titanium-sapphire lasers, diode-pumped solid-state lasers, fiber lasers, Neodymium-YAG lasers.

Apparatus 28 is composed of a noise generator 30, more specifically an electrical radio-frequency (RF) noise generator that produces an RF noise signal 31 spanning a certain frequency range. The noise spectrum of noise signal 31 can be substantially flat or sloping within that frequency range. In the present embodiment, the noise spectrum is substantially flat.

Noise generator 30 is connected to an electrical filter 32 for filtering noise signal 31. Filter 32 has a bandwidth in excess of emission linewidth $\delta_E$ at full width half maximum (FWHM) of laser 48. Additionally, filter 32 is provided with an optional passband control 34 in this embodiment. Noise generator 30 should, but is not required to, have a bandwidth that is greater than that of filter 32. Passband control 34 can adjust the passband of filter 32 to meet this requirement.

An amplification stage 36 here in the form of an RF amplifier is provided after filter 32 for amplifying noise signal 31 after it passes through filter 32. Amplifier 36 is connected to an EOM 40. EOM 40 is an electrically broadband (non-resonant) EOM made of an optical crystal 42 positioned between two electrodes 44A, 44B. Optical crystal 42 is selected, without limitation from among lithium niobate, MgO-doped lithium niobate, potassium dihydrogen phosphate (KDP), potassium dideuterium phosphate (KD*P), potassium titanyl phosphate (KTP) or other suitable electro-optically active crystals. EOM 40 can include additional electrical elements (not shown) as will be appreciated by those skilled in the art. In addition, EOM 40 has an electrical 3-dB bandwidth in excess of emission linewidth $\delta_E$ at FWHM of laser 48.

An impedance matching circuit 41 is connected between EOM 40 and amplifier 36. Impedance matching circuit 41 has components such as capacitors, inductors, transformers (not shown) to match the electrical impedance of amplifier 36 to the electrical impedance of EOM 40. The impedance of EOM 40 is due to the combination of crystal 42 and electrodes 44A, 44B. In embodiments where EOM 40 has additional electrical elements these also contribute to the electrical impedance of EOM 40. Circuit 41 is constructed to match the impedance of amplifier 36 to EOM 40. In cases where the electrical impedance of noise generator 30 or even filter 32 is significant, circuit 41 also accounts for those impedances. In a typical embodiment, circuit 41 has an impedance of about 50 Ohms. The principles of impedance matching and corresponding adjustments of the actual impedance of circuit 41 will be familiar to those skilled in the art.

EOM 40 is positioned to intercept a light 46 emitted by laser 48 at an output frequency $\nu$. Emission bandwidth $\delta_E$ of light 46 is narrow and is conditioned by the properties of laser 48. For better visualization, the optical power of light 46 is graphed as a function of frequency in FIG. 2B.

During operation, apparatus 28 drives EOM 40 with filtered and amplified noise signal 31. In particular, noise generator 30 produces noise signal 31 preferably covering a continuous range commencing at a low frequency $\omega_L$ and terminating at a high frequency $\omega_H$ above emission linewidth $\delta_E$. The range or bandwidth of noise signal 31 is limited by the passband of filter 32. Additionally, filter 32 can adjust a noise spectrum 38 of noise signal 31. For example, filter 32 can flatten or produce a slope in noise spectrum 38.

Figure 3A:
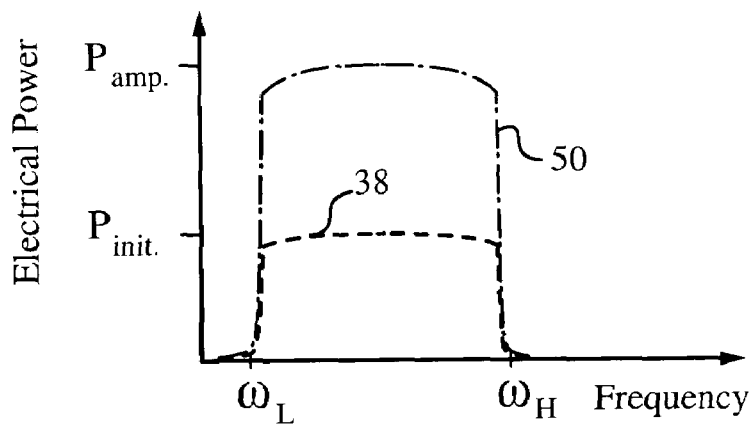
FIGS. 3A-C are graphs illustrating a number of noise signal spectra and shapes of the filtered and/or amplified noise signals.

In the present embodiment noise generator 30 produces noise signal 31 whose noise spectrum 38 is flat as shown in FIG. 3A. More precisely, FIG. 3A illustrates the electrical power level of signal 31 over its frequency range from $\omega_L$ to $\omega_H$ at an initial level $P_{init}$. No flattening of noise spectrum 38 by filter 32 is applied in this embodiment. Note that low frequency $\omega_L$ must be below emission linewidth $\delta_E$ of laser 48 while high frequency $\omega H$ may take on any practicably high value above the emission linewidth $\omega_E$ of laser 48.

Figure 3B:
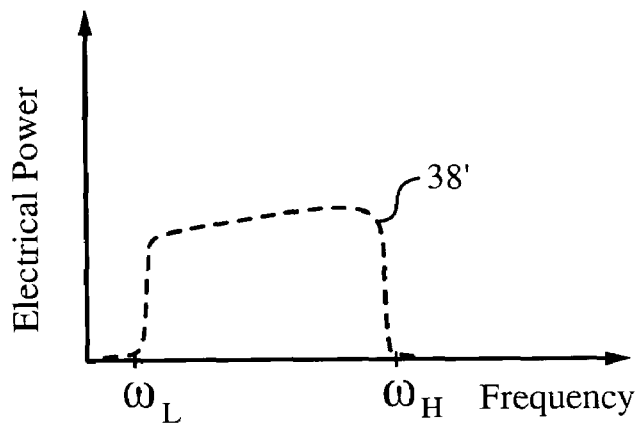
Figure 3C:
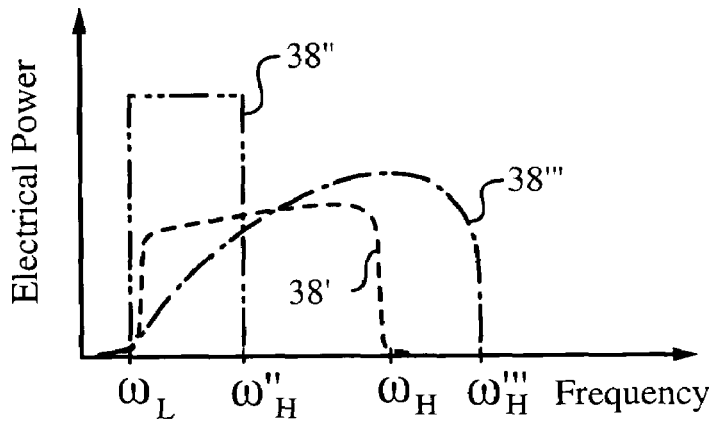

In general, noise spectrum 38 may take on other shapes, as shown in FIGS. 3B and 3C. In FIG. 3B a noise spectrum 38' of noise signal 31 is gently sloping with increasing frequency. In FIG. 3C a noise spectrum 38" is square and a noise spectrum 38''' exhibits a ramp-up and a roll-off. Noise generators producing flat (FIG. 3A) or gently sloping (FIG. 3B) spectra such as 38 or 38' are preferred. Of course, filter 32 and passband control 34 can be used to shape noise spectra of noise generators that do not intrinsically exhibit a preferred noise spectrum to obtain spectra such as 38 or 38'.

Noise signal 31 is passed from filter 32 to amplifier 36, to produce amplified noise signal 31 exhibiting an amplified spectrum 50 as indicated in FIG. 3A in dashed and dotted line. Amplifier 36 amplifies noise signal 31 without distorting noise spectrum 38 such that amplified spectrum 50 resembles the shape of spectrum 38 but exhibits a higher amplified power level $P_{amp}$. Amplifier 36 possesses an electrical 3-dB bandwidth that is greater than the emission linewidth $\delta_E$ at FWHM of laser 48. It is important that amplifier 36 amplify noise signal 31 to an amplified power level $P_{amp}$ that is sufficient to drive EOM 40 and cause mixing between noise signal 31 launched into EOM 40 and light 46. Amplifier 36 is optional in embodiments where noise generator 30 and filter 32 deliver noise signal 31 at a sufficiently high power level to drive EOM 40. Note also that the filtering function of filter 32 and passband control 34 may be incorporated into the function of amplifier 36, impedance matching circuit 41, or both.

The amplified and filtered noise signal 31 is applied by amplifier 36 to EOM 40 via electrodes 44A, 44B. The amplified noise signal has an effect on the refractive index n of optical crystal 42 and thereby causes modulation of light 46 propagating through optical crystal 42. More precisely, amplified noise signal 31 produces a varying electric field across crystal 42 and this electric field induces time-dependent changes in the refractive index n of crystal 42. Light 46 propagating through crystal 42 is susceptible to changes in refractive index n and thus experiences an optical phase shift related to the index change within crystal 42. Since amplified noise signal 31 is random (or pseudorandom) over its frequency range from $\omega_L$ to $\omega_H$, the variation of the refractive index n and hence of the optical phase shift are also random (or pseudorandom). As a result, emission linewidth $\delta_E$ of light 46 entering crystal 42 is broadened to a broadened linewidth $\delta_B$. Thus, an output light 52 exiting crystal 42 is broadened homogeneously.

Figure 2B:
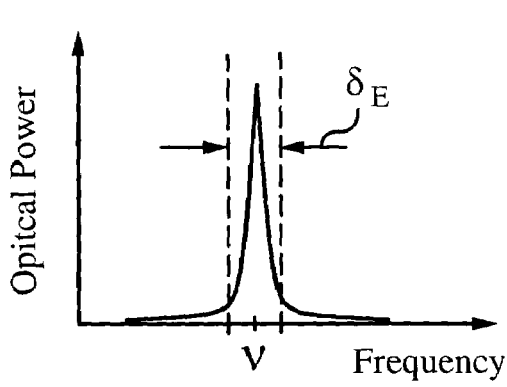
Figure 2C:
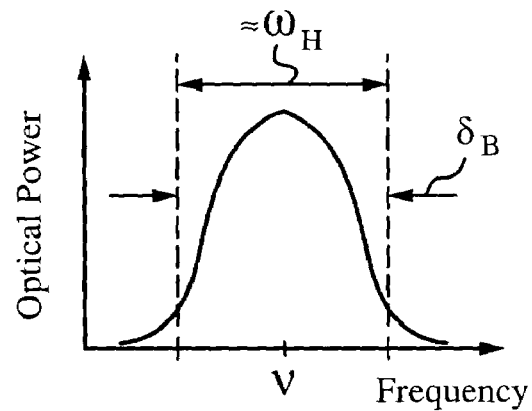

In fact output light 52 exhibits broadened linewidth $\delta_B$ that is roughly proportional to high frequency $\omega_H$. FIGS. 2B and 2C show that the emission linewidth $\omega_E$ of light 46 passing through EOM 38 from laser 48 (first graph) is spectrally broadened to broadened linewidth $\delta_B$ (second graph). It should be noted that output light 52 has a shorter coherence length, $L_c$, than light 46 originally emitted from laser 48.

Secondary EOM(s) driven by broadband signals (e.g., noise signals, also referred to as non-resonant EOMs) or by single frequency drive signals (also referred to as resonant EOMs) can be added to expand upon the approach utilized in apparatus 28. While a particular embodiment may call for secondary EOMs with increasingly high resonant or broadband frequencies in series in order to further broaden broadened linewidth $\delta_B$, this is by no means an inherent restriction. Many other arrangements and combinations of EOMs, irrespective of their frequencies, are permissible. The individual modulators can be turned on or off and/or have their drive levels adjusted in order to effect a change in the lineshape or amount of broadening.

Figure 4:
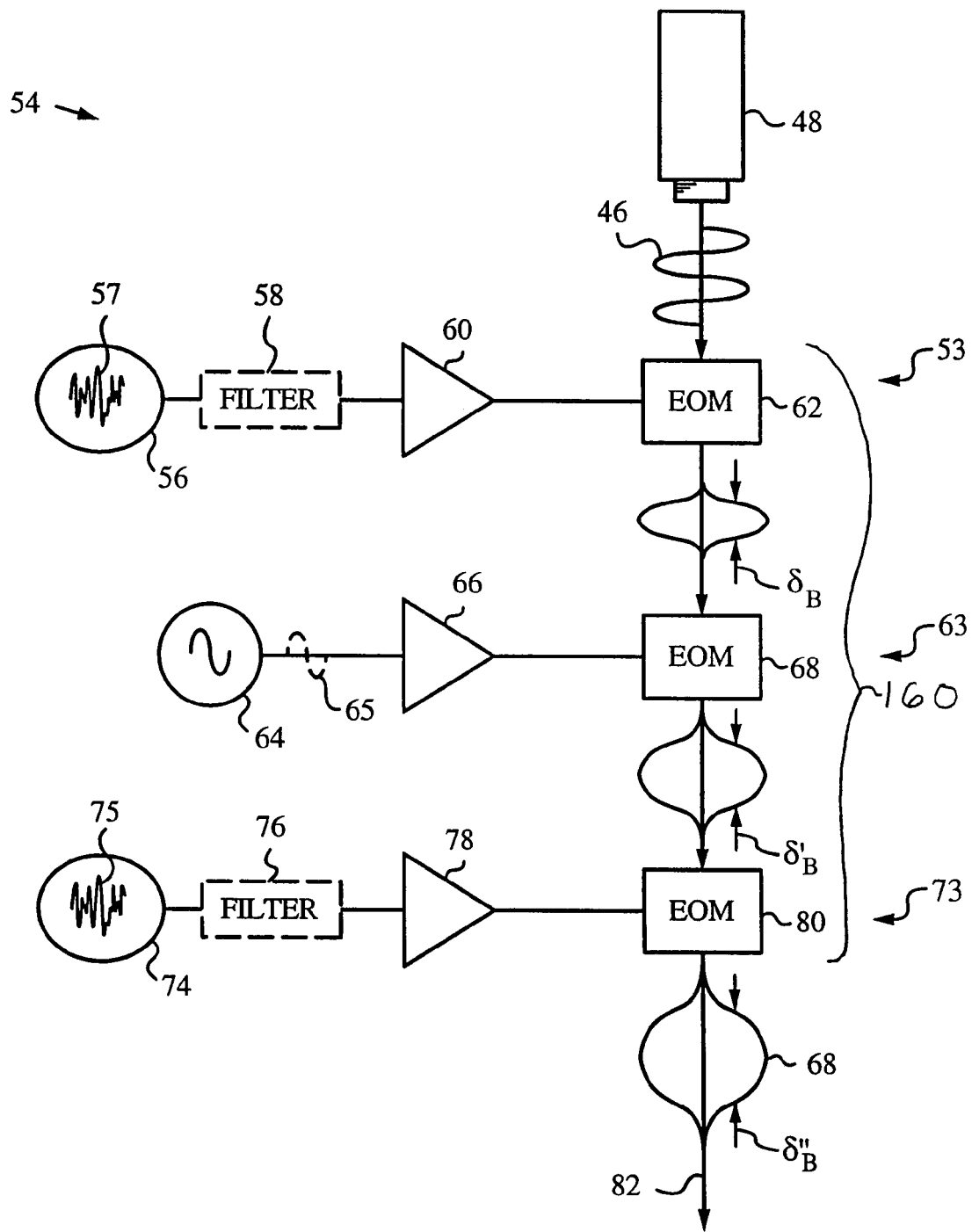
FIG. 4 is a diagram illustrating another embodiment of the apparatus equipped with secondary EOMs to further broaden the broadened linewidth.

FIG. 4 illustrates an apparatus 54 that employs three EOMs in three stages to broaden emission linewidth $\delta_E$ of light 46 emitted by laser 48. In a first stage 53 apparatus 54 has a first RF noise generator 56 for generating a noise signal 57, a filter 58 for filtering noise signal 57 and an amplifier 60 for amplifying filtered noise signal 57. A first non-resonant EOM 62 is driven by filtered and amplified noise signal 57. EOM 62 is positioned to intercept light 46. In fact, first stage 53 of apparatus 54 is similar to apparatus 28 described above.

In a second stage 63, apparatus 54 has a secondary signal generator 64 for generating a secondary signal 65 at one frequency. The frequency of the secondary signal 65 is contained in the RF frequency range. An amplifier 66 is provided for amplifying secondary signal 65 and applying it to a secondary EOM 68. Since secondary signal 65 contains only one frequency, EOM 68 is driven resonantly; i.e., EOM 68 is a resonant EOM. Furthermore, EOM 68 is positioned to intercept light 46 after it passes through EOM 62 of first stage 53. In a typical embodiment, signal 65 is a sine wave whose frequency is above the high-frequency cutoff of noise filter 58 (previously referred to as $\omega_H$).

A third stage 73 of apparatus 54 has a secondary RF noise generator 74 for generating a secondary RF noise signal 75 spanning a secondary frequency range. Stage 73 has a filter 76 for filtering noise signal 75 and an amplifier 78 for amplifying noise signal 75 and driving an EOM 80. EOM 80 is non-resonant and is positioned to intercept light 46 after it passes through EOM 68 of second stage 63.

Light 46 emitted by laser 48 has an output frequency ν and an emission linewidth $\delta_E$. During modulation of light 46 by non-resonant EOM 62 of first stage 53 linewidth $\delta_E$ is homogeneously broadened to a broadened linewidth $\delta_B$. When passing through resonant EOM 68 of second stage 63 the broadened linewidth $\delta_B$ of light 46 is additionally broadened to a linewidth $\delta_B'$ by the addition of side lobes (non-homogeneous broadening). Light 46 with this broadened linewidth $\delta_B'$ subsequently passes through non-resonant secondary EOM 80, and experiences further homogeneous broadening of broadened linewidth $\delta_B'$ to a final output linewidth $\delta_B''$.

Thus, apparatus 54 produces output light 82 whose final output linewidth $\delta_B''$ is achieved by successive broadening in three stages 53, 63, 73. A person skilled in the art will recognize that more or fewer than three stages with resonant and non-resonant EOMs in various order can be implemented. For example, apparatus 54 can be operated with only stages 53, 63. EOM 62 and EOM 80 are subject to the same restrictions as EOM 40 since they are non-resonant. On the other hand, EOM 68 is preferably a resonant EOM (but it is not a requirement that it be resonant).

Figure 5:
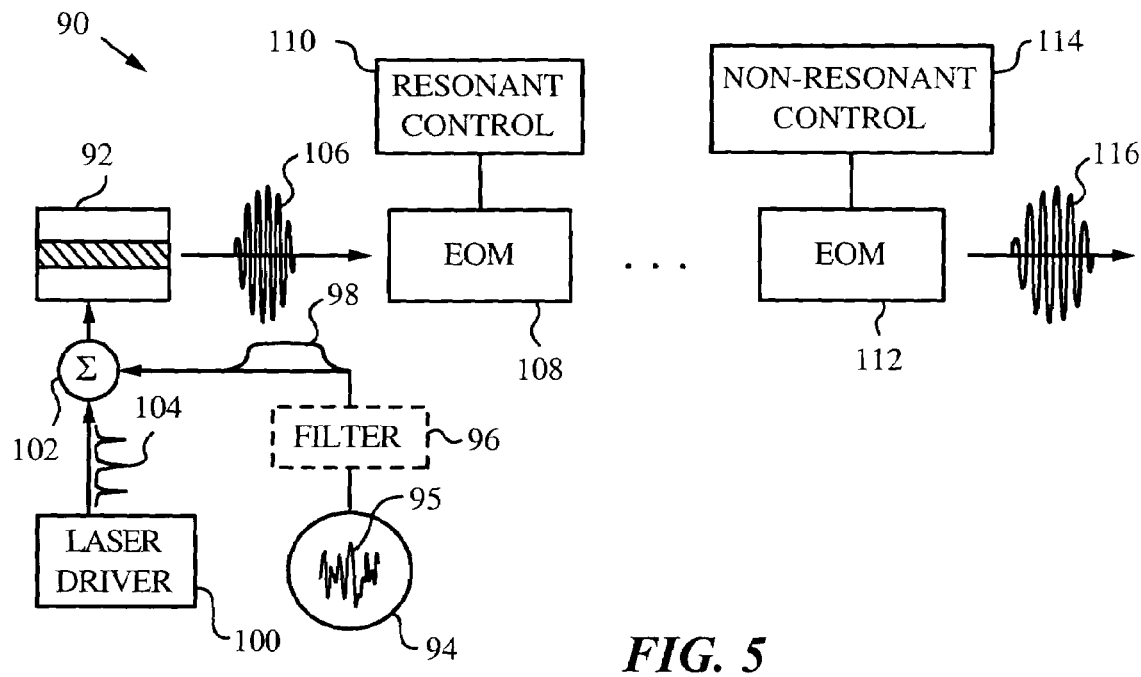
FIG. 5 is a diagram illustrating still another embodiment of the apparatus that incorporates a laser diode driver that can be directly coupled to a noise generator to broaden the linewidth of a diode laser.

Apparatus 90, depicted schematically in FIG. 5, represents another embodiment of the invention adapted for broadening the emission linewidth $\delta_E$ of a laser diode 92. Apparatus 90 has an RF noise generator 94 for producing a noise signal 95. Noise signal 95 is filtered by filter 96 to produce a filtered noise signal with a noise spectrum 98. As explained above, filter 96 can limit the bandwidth of noise signal 95 and/or control the shape of noise spectrum 98.

Laser diode 92 is connected to a laser driver 100, which generates a drive current 104 for driving diode 92. In accordance with the invention, a summing circuit 102 is provided for adding noise 95 to drive current 104.

The application of RF noise signal 95 to laser diode 92 with drive current 104 directly modulates the phase of an emitted light 106. This is because the pumping electrons in the active portion of the chip of laser diode 92 are affected not only by drive current 104 but also by the current associated with RF noise signal 95. Hence, stimulated emission of light 106 from the active layer is influenced by RF noise signal 95 and causes broadening of emission linewidth $\delta_E$ of emitted light 106 to a broadened linewidth $\delta_B$.

If desired, emitted light 106 may be further subjected to modulation by an EOM 108 operated in resonant mode by corresponding resonant control 110 and EOM 112 operated in non-resonant mode by corresponding non-resonant control 114. In fact, a number of resonant and non-resonant EOMs can be set up in stages as indicated in FIG. 5. Resonant mode EOM 108 and non-resonant mode EOM 112 are both subject to similar restrictions as EOM 40, with the exception that EOM 108 can be (and is preferably) a resonant EOM. The addition of EOMs 108, 112 and any other EOMs serves to further broaden linewidth $\delta_B$ in output light 116.

The apparatus of invention achieves homogenous broadening of the emission line without significantly decreasing the optical power 10 of the output beam. This desirable result is attained by appropriately selecting the noise signal and in particular its spectral composition. It should be noted that a noise signal whose frequency range is continuous and ranges from a low frequency $\omega_L$ near or preferably below the emission linewidth $\delta_E$ to a high frequency $\omega_H$ above the emission linewidth $\delta_E$ is applied first with a non-resonant EOM. In this range the noise signal has a flat noise spectrum (white noise) or a sloping or tilted spectrum (pink noise). In some embodiments a spectrum consisting of a series of distinct spectral components (i.e., a "comb" of frequencies) can also be applied. However, this comb must contain frequencies between the low and high frequencies $\omega_L$, $\omega_H$ and the comb spacing must be comparable to or less than emission linewidth $\delta_E$.

In practice, the requirements of homogeneously broadening the emission linewidth of a laser using an EOM is that the average power spectral density (PSD, i.e., units of dB/Hz) of the noise signal applied to the EOM must be sufficiently high to produce significant modulation depth in the EOM. There is a practical limit to how much broadening a single noise-driven broadband EOM can produce, which arises from the total amount of RF power that can be safely applied to the EOM (ultimately limited by heating of the crystal). Since the minimum effective PSD required to produce broadening is a constant, the amount of RF noise power required to be applied is proportional to the high frequency $\omega_H$. If broadening beyond this limit is desired, then the use of one or more secondary EOMs is recommended to further increase the effective broadening, as discussed above.

Figure 6:
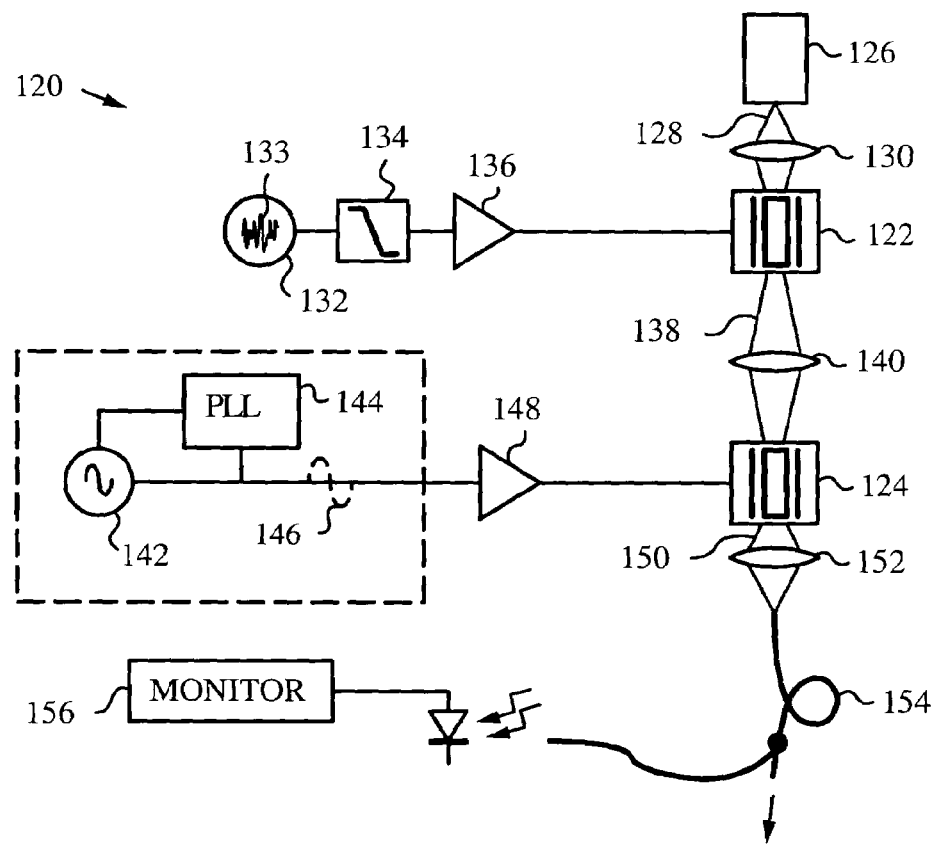
FIG. 6 is a diagram illustrating a detailed embodiment of yet another apparatus utilizing a secondary resonant EOM and a monitoring device.

FIG. 6 illustrates a specific embodiment of an apparatus 120 employing EOMs 122 and 124 to homogeneously broaden the emission linewidth of laser 126. Laser 126 emits a light 128 whose emission linewidth $\delta_E$ is narrower than ultimately desired. Light 128 is emitted into free space. Light 128 is optically coupled into broadband EOM 122 with the aid of a lens 130. Broadband EOM 122 is electrically driven by an RF noise generator 132. A low-pass filter 134 filters a noise signal 133 produced by noise generator 132, and a power amplifier 136 amplifies filtered noise signal 133. The noise bandwidth and power of noise signal 133 are selected in accordance with above-discussed criteria to obtain a broadened linewidth in beam 138 issuing from EOM 122.

Beam 138 is delivered to secondary resonant EOM 124 with the aid of a lens 140 to further broaden the already broadened linewidth. Resonant EOM 124 is driven by a single frequency RF signal generator 142 whose RF frequency secondary signal is stabilized with a phase lock loop (PLL) 144. Specifically, PLL 144 electronically locks the phase of signal generator 142 and sets RF secondary signal 146 to a single frequency. Secondary signal 146 is then amplified by an amplifier 148 and applied to EOM 124. As a result, EOM 124 emits an output beam 150 whose linewidth is broadened further than broadened linewidth obtained from EOM 122.

A lens 152 is used to couple output beam 150 into optical fiber 154. Fiber 154 can be used to deliver beam 150 to a variety of instruments (not shown) as well as a monitor 156 for performance monitoring. In the present embodiment this is accomplished by tapping a portion of beam 150 with the aid of a Y-junction in fiber 154. The remainder of beam 150 is delivered to the desired application or applications.

A very specific embodiment of apparatus 120 is provided here for example purposes only and without implying any limitations the various components used are as follows. Laser 126 is a New Focus 6009 laser. Broadband EOM 122 is a New Focus 4002 broadband EOM that is electrically driven by RF noise generator 132, such as a Micronetics NMA-2107-A2T. Low-pass filter 134 is a 100 MHz Mini-circuits SLP-100 low-pass filter, while amplifier 136 is a Mini-circuits ZHL-5W-1.Resonant EOM 124 is a 160 MHz New Focus 4001 EOM fed by RF signal generator 142 phase locked with PLL 144. The latter two components are represented by a unit of Nova Engineering NS2-0110104.Amplifier 148 is a Mini-circuits ZHL-1A. Multimode optical fiber serves as optical fiber 154 and couples output light 150 to monitoring instruments. Examples of a suitable monitor 156 are monitoring instruments such as a Fabry Perot optical spectrum analyzer combined with an oscilloscope or a photodetector and RF spectrum analyzer capable of detecting residual amplitude modulation.

While these components are all described as part of apparatus 120, by no means is the apparatus limited in scope to the use of these components or predicated on their inclusion to properly function. They are merely examples to provide a highly specific embodiment of the invention.

In still another embodiment of the invention the EOMs, including both resonant and non-resonant EOMs as the case may be, can be integrated as shown in FIG. 4 in one single optical crystal 160. The crystal 160 is equipped with separate pairs of electrodes attached at different locations. Each pair of electrodes is used for applying one of the signals. For example, a first pair of electrodes is used for applying a noise signal to drive a non-resonant BOM and a second pair of electrodes is used for applying a secondary signal at a single frequency to drive a resonant BOM. In this manner, a number of EOMs can be integrated in a single crystal and the order and combination of resonant and non-resonant BOM can be easily adjusted by simply changing the electrode pair to which the signal is applied. Integrating the EOMs in a single optical crystal is advantageous since it reduces the free space propagation of the light and obviates the need for beam guiding optics.

It should also be noted that whether the EOMs are integrated or not, the order of the resonant and non-resonant EOMs can be altered. For example, the secondary EOM driven by the secondary signal can be positioned before the non-resonant EOM driven by the noise signal.

In view of the above, it will be clear to one skilled in the art that the above embodiments may be altered in many ways without departing from the scope of the invention. Accordingly, the scope of the invention should be determined by the following claims and their legal equivalents.

What is claimed is:

1. An apparatus for linewidth broadening comprising:
   a) a laser for emitting a light having an output frequency $\nu$ and an emission linewidth $\delta_E$;
   b) an electro-optic modulator for intercepting said light;
   c) a noise generator for driving said electro-optic modulator with a radio-frequency noise signal spanning a predetermined frequency range such that said emission linewidth $\delta_E$ is broadened to a broadened linewidth $\delta_B$;
   wherein said predetermined frequency range is a continuous frequency range commencing at a low frequency $\omega_L$ below said emission linewidth $\delta_E$ and terminating at a high frequency $\omega_H$ above said emission linewidth $\delta_E$;

wherein said noise generator comprises an amplification stage for amplifying said noise signal.

2. The apparatus of claim 1, wherein said noise generator comprises a noise source and a filtering element.

3. The apparatus of claim 2, wherein said filtering element comprises a low-pass filter.

4. The apparatus of claim 2, wherein said filtering element comprises a passband control for varying a passband of said filtering element.

5. The apparatus of claim 2, wherein said radio-frequency noise generator has a substantially flat noise spectrum within said predetermined frequency range.

6. The apparatus of claim 2, wherein said radio-frequency noise generator has a sloping noise spectrum within said predetermined frequency range.

7. The apparatus of claim 1, wherein said electro-optic modulator comprises an optical crystal selected from the group consisting of lithium niobate, MgO-doped lithium niobate, potassium dihydrogen phosphate. (KDP), potassium dideuterium phosphate (KD*P), and potassium titanyl phosphate. (KTP).

8. An apparatus for linewidth broadening comprising:
   a) a laser for emitting a light having an output frequency $v$ and an emission linewidth $\delta_E$;
   b) an electro-optic modulator for intercepting said light;
   c) a noise generator for driving said electro-optic modulator with a radio-frequency noise signal spanning a predetermined frequency range such that said emission linewidth $\delta_E$ is broadened to a broadened linewidth $\delta_B$;
   wherein said predetermined frequency range is a continuous frequency range commencing at a low frequency $v_L$ below said emission linewidth $\delta_E$ and terminating at a high frequency $\omega_H$ above said emission linewidth $\delta_E$;
   further comprising an impedance matching circuit for matching the electrical impedance of said electro-optic modulator and said noise generator.

9. The apparatus of claim 8, wherein said impedance matching circuit has an electrical impedance of about 50 Ohms.

10. The apparatus of claim 1, further comprising at least one secondary electro-optic modulator for intercepting said light, said at least one secondary electro-optic modulator having a signal generator for applying to said at least one electro-optic modulator a secondary signal, such that said light is modulated by said secondary signal.

11. The apparatus of claim 10, wherein said secondary signal generator comprises a single frequency generator such that said secondary signal comprises one frequency.

12. The apparatus of claim 10, wherein said secondary electro-optic modulator is integrated with said electro-optic modulator.

13. The apparatus of claim 10, wherein said secondary electro-optic modulator is positioned before said electro-optic modulator.

14. An apparatus for linewidth broadening comprising:
   a) a laser for emitting a light having an output frequency $v$ and an emission linewidth $\delta_E$;
   b) an electro-optic modulator for intercepting said light;
   c) a noise generator for driving said electro-optic modulator with a radio-frequency noise signal spanning a predetermined frequency range such that said emission linewidth $\delta_E$ is broadened to a broadened linewidth $\delta_B$;
   wherein said predetermined frequency range is a continuous frequency range commencing at a low frequency $\omega_L$ below said emission linewidth $\delta_E$ and terminating at a high frequency $\omega_H$ above said emission linewidth $\delta_E$;
   at least one secondary electro-optic modulator for intercepting said light, said at least one secondary electro-optic modulator having a signal generator for applying to said at least one electro-optic modulator a secondary signal, such that said light is modulated by said secondary signal;
   wherein said secondary signal generator comprises a secondary noise generator such that said secondary signal is a secondary radio-frequency noise signal spanning a secondary frequency range.

15. The apparatus of claim 1, wherein said laser is selected from the group consisting of edge-emitting diode lasers, surface-emitting lasers, gas lasers, solid-state lasers, external-cavity diode lasers, titanium-sapphire lasers, diode-pumped solid-state lasers, fiber lasers, and Neodymium-YAG lasers.

16. A method for linewidth broadening of a light emitted from a laser at an output frequency $v$ and an emission linewidth $\delta_E$, said method comprising:
   a) intercepting said light with an electro-optic modulator;
   b) driving said electro-optic modulator with a radio-frequency noise signal spanning a predetermined frequency range such that said light is modulated by said noise signal thereby broadening said emission linewidth $\delta_E$ to a broadened linewidth $\delta_B$;
   wherein said predetermined frequency range is a continuous frequency range commencing at a low frequency $\omega_L$ below said emission linewidth $\delta_E$ and terminating at a high frequency $\omega_H$ above said emission linewidth $\delta_E$;
   and further comprising amplifying said noise signal.

17. The method of claim 16, wherein said predetermined frequency range is selected such that said emission linewidth $\delta_E$ is broadened substantially homogeneously.

18. The method of claim 16, further comprising modulating said light with at least one secondary signal thereby further broadening said broadened linewidth $\delta_B$.

19. The method of claim 18, wherein said at least one secondary signal comprises one frequency.

20. The method of claim 18, wherein said at least one secondary signal spans a secondary frequency range.

21. An apparatus for linewidth broadening comprising:
   a) a laser for emitting a light having an output frequency $v$ and an emission linewidth $\delta_E$;
   b) an electro-optic modulator for intercepting said light;
   c) a noise generator for driving said electro-optic modulator with a radio-frequency noise signal spanning a predetermined frequency range such that said emission linewidth $\delta_E$ is broadened to a broadened linewidth $\delta_B$;
   d) at least one secondary electro-optic modulator for intercepting said light, said at least one secondary electro-optic modulator having a secondary signal generator for applying to said at least one electro-optic modulator a secondary signal, such that said light is modulated by said secondary signal;
   wherein said secondary signal generator comprises a secondary noise generator such that said secondary signal is a secondary radio-frequency noise signal spanning a secondary frequency range.

* * * * *